Sept. 15, 1964  L. H. CARR  3,148,553
VALVE OPERATORS
Filed Dec. 20, 1960  2 Sheets-Sheet 1
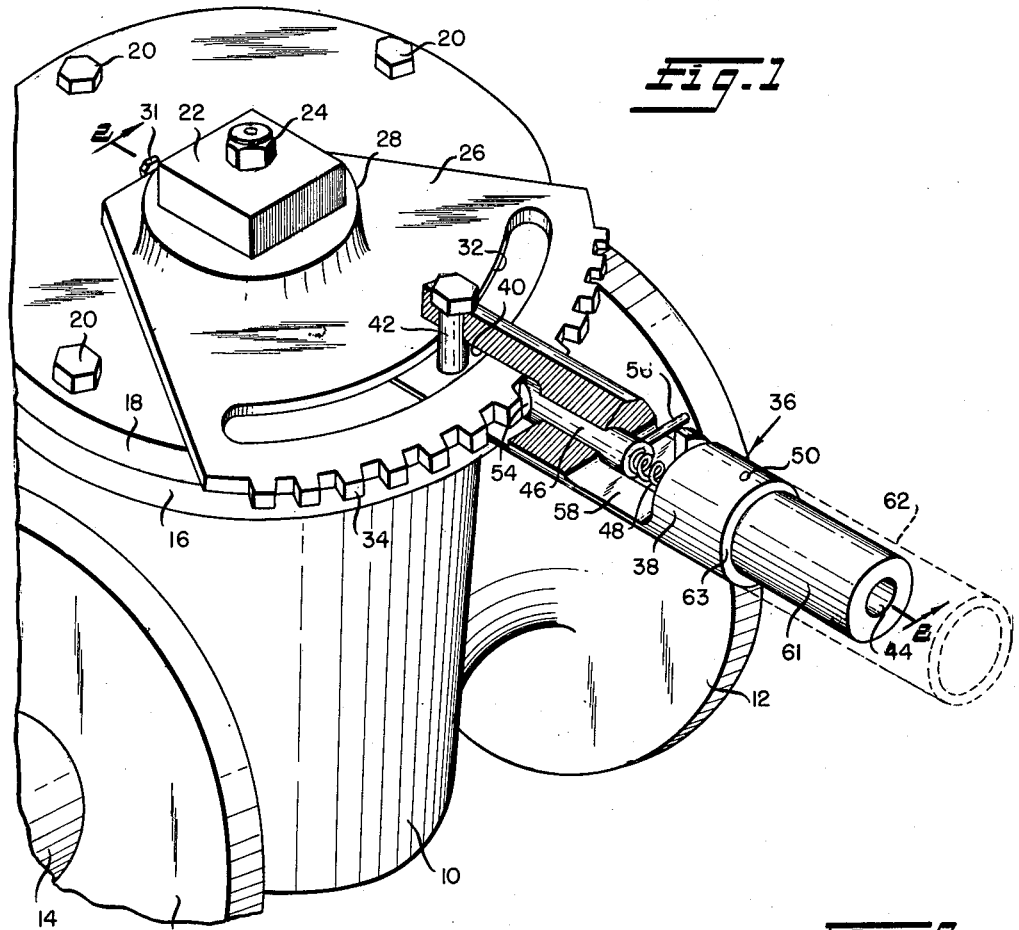
INVENTOR
Laurence H. Carr
BY Strauch, Nolan & Neale
ATTORNEYS

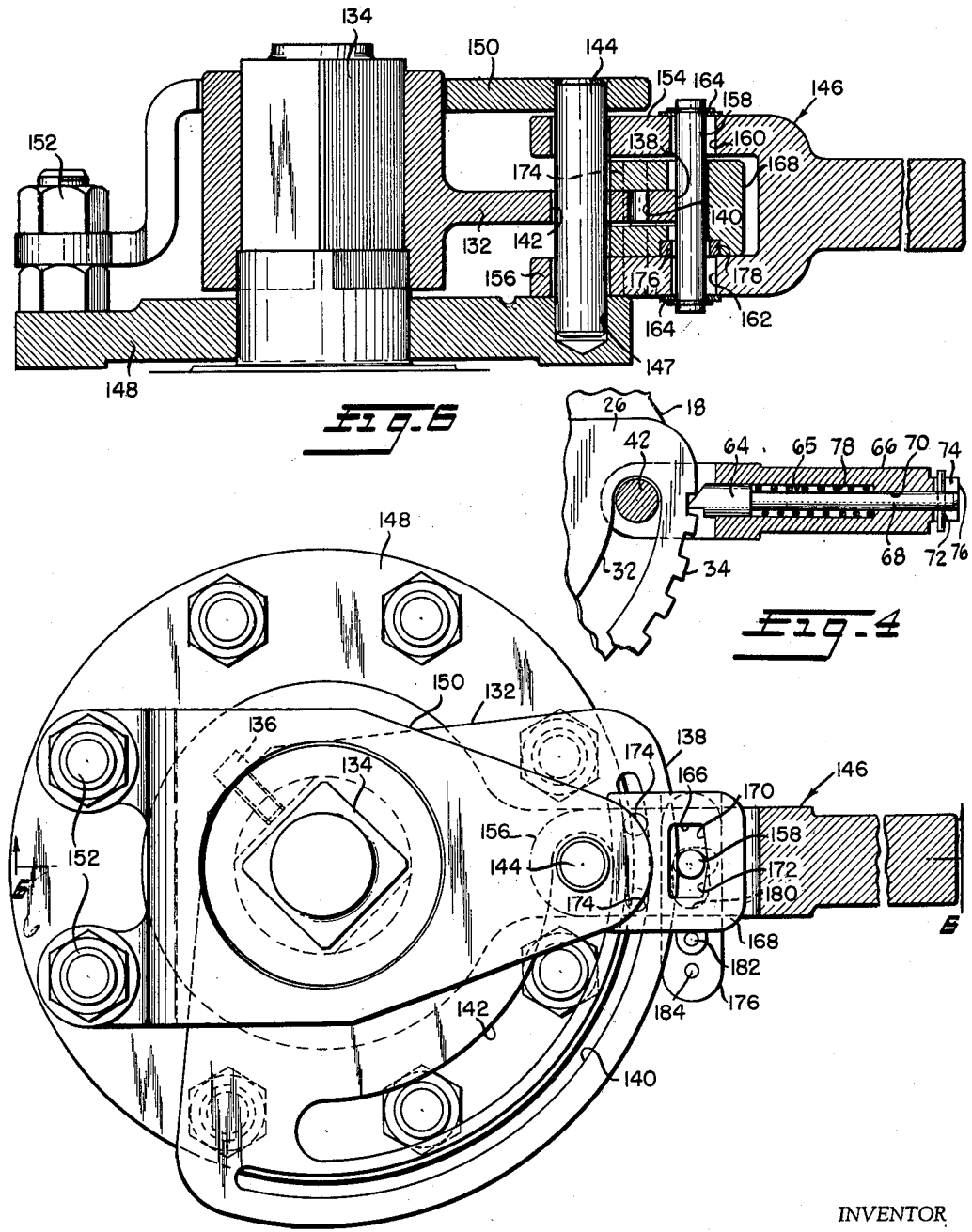

3,148,553
VALVE OPERATORS
Laurence H. Carr, Homewood, Ill., assignor to Edward Valves, Inc., East Chicago, Ind., a corporation of Delaware
Filed Dec. 20, 1960, Ser. No. 77,130
4 Claims. (Cl. 74—142)

This invention relates to valve operators and more particularly to operators for valves having a rotary valve closure member, for example a plug valve or a ball valve.

In a number of cases the torque required to operate a plug or ball valve exceeds slightly the torque which can be applied by one man. In these cases a supplementary operator of some nature is required. In cases where very high operating torques are encountered, drive motors and suitable gear reduction devices or other forms of power operators may be employed. However the cost of such operators may be as much or more than the cost of the valve itself and accordingly the use of such devices is restricted to cases where they are absolutely essential to effect operation of the valve. Thus in many cases where the force required to operate the valve exceeds 130–140 lbs. which is generally regarded as the maximum force which one man should be required to apply, common practice presently dictates that two men operate the valve or that some relatively simple form of force multiplying device be used to facilitate manual operation of the valve by one man.

Force multiplication can be realized by the application of reduction gearing devices of various forms. The most popular of such devices at present is a simple gear reduction unit, the output end of which is connected to the valve closure member and the input end of which is provided with a handwheel for manual operation. Since the size of the handwheel must be limited because of space limitations and since for the same reasons most of the gear drive devices include worm gears which have an efficiency of 25% or less, it is necessary to employ a gear reduction about 50:1 to provide the desired result. In a typical case, for example, in which a pull of 150 lbs. on the end of a 36" wrench is required to operate the valve, the installation of a conventional gear drive to reduce the applied force to 50 lbs. requires that the operator make 12 complete revolutions of the gear drive handwheel to move the valve between its open and closed positions. Thus while such devices reduce the required operating force to an acceptable level, they substantially increase the time required for opening and closing the valve and thus prevent effective operation of the valve under emergency conditions. Also while the cost of the simple gear reduction devices is well below the cost of the power operator, nevertheless the cost is not an inconsequential item and may run to several hundred dollars.

With the foregoing considerations in mind, it is the principal purpose and object of the present invention to provide improved valve operators which permit rapid, effective one man operation of valves which would otherwise be operated only by two or more men, by a power driven operator or by a high ratio gear reduction device.

It is a further object of the present invention to provide improved manual valve operators which are simple to construct and install and simple to operate.

It is also an object of the present invention to provide improved means for transmitting the force exerted on the valve operator to the valve closure member.

It is an additional object of the present invention to provide improved operators which are considerably more efficient than the prior gear reduction devices and considerably more economical than prior power operator devices.

It is also an object of the present invention to provide improved manual operators for rotary valves that operate reversibly through a 90° arc to open and close the plug valve.

Additional objects and advantages will become apparent as the description proceeds in connection with the accompanying drawings in which:

FIGURE 1 is a perspective view of a tapered plug valve incorporating the preferred form of the novel valve operator of the present invention;

FIGURE 2 is a vertical section taken along line 2—2 showing details of the operator;

FIGURE 3 is a fragmentary top plan view of the valve operator of FIGURE 1;

FIGURE 4 is a fragmentary vertical section showing a modified form of the invention;

FIGURE 5 is a top plan view of a modified form of the invention; and

FIGURE 6 is a fragmentary section taken along lines 6—6 of FIGURE 5 showing details of construction.

For present purposes the preferred form of the valve operator of the present invention has been shown applied to a tapered plug valve of conventional construction. However it is to be understood that the invention in both of its forms is equally applicable to valves having a cylindrical plug member and to ball valves or any other type of valve where the closure member is moved through an arc of about 90° between open and closed positions.

The valve shown in FIGURE 1 comprises a body 10 having integral flanges 12 for connection to associated piping not shown, the flanges surrounding oppositely directed flow ports 14 (one shown). The upper end of the body 10 is provided with an integral flange 16 to which a top cover plate 18 is secured by a plurality of bolts 20. In accordance with conventional practice, the valve plug or closure member (not shown) is provided with an integral stem 22 which projects upwardly through the cover plate 18. A lubricant fitting 24 is provided at the upper end of the stem 22. The valve operator of the present invention is mounted entirely above the top cover plate 18 and requires no modification of the standard valve components.

The valve operator includes a gear segment 26 comprising an essentially flat plate with an upwardly projecting boss 28 in which an opening 30 is formed which fits closely over the projecting upper end of the valve stem 22 to prevent relative rotation between the gear segment and the stem 22. The gear segment 26 is held on the stem by a set screw 31. At its larger end the gear segment 26 is provided with an arcuate opening 32 concentric with the axis of valve stem 22 and on its outer projecting end is provided with a driving surface comprising a series of gear teeth 34, also formed concentrically about the axis of the valve stem 22.

The gear segment 26 and the stem 22 are moved by a ratchet assembly indicated generally at 36, the principal component of which is a substantially cylindrical handle member 38 having a slot 40 at one end in which the outer peripheral portion of the gear sector 26 is received. The inner end of the handle assembly 36 is pivotally mounted on a pin 42 rigid with the top cover plate 18. The handle member 38 is provided with a through bore 44, the inner end of which merges into the slot 40. A cylindrical pawl 46 is slidably mounted in the inner end of the bore 44 and is urged inwardly toward the gear teeth 34 by a spring 48 compressed between the outer end of the pawl 46 and a transverse pin 50.

The inner end of the pawl 46 is provided with a flat surface 52 for driving engagement with one side of one of the gear teeth 34 and a beveled surface 54 which effectively lifts the pawl out of engagement with the gear teeth as the ratchet assembly 36 moves in clockwise direction as viewed in FIGURES 1 and 3. A pin 56 projecting laterally from the side of the outer end of the pawl 46 projects through an L-shaped slot formed in the handle member 38, the slot having horizontal portions 58 and a vertical portion 60 connecting the portions 58. By virtue of this construction, the pawl 46 may be reversed by moving the pin 56 to the right as viewed in FIGURE 2, moving it through the slot portion 60 and into the opposite horizontal slot portions 58 to provide a drive in the reverse direction as desired. Preferably the outer end of the ratchet member 38 is provided with an integral extension 61 over which a length of extension pipe 62 may be fitted if it is desired to increase the mechanical advantage of the device. A shoulder 63 formed at the inner end of the reduced section 61 forms a positive stop for positioning the bar or pipe 62.

With the pawl disposed as shown in FIGURES 1, 2 and 3, movement of the ratchet assembly in a counterclockwise direction about the axis of pivot pin 42 will move the gear sector 26 through a smaller arc in the same direction. On the return stroke the pawl 46 rides over the gear teeth 34 while the gear segment 26 remains stationary because of the internal friction within the valve. Movement of the valve toward its open or closed position is continued by repeating the operation of the ratchet member. As noted above, the valve may be moved in the opposite direction by reversing the position of the pawl through appropriate operation of the pin 56.

The ratchet operator as shown in the drawings is constructed so that ten strokes of the ratchet mechanism 36 move the gear segment 26 and the valve stem through an arc of 90° to move the valve between its full open and full closed positions. However the exact number of strokes required to effect one complete operation can be varied as desired to suit the requirements of a particular installation.

The mechanical advantage of the device in FIGURES 1 and 2 is the ratio of the distance between the center of the plug and the tooth radius 34 to the distance between the axis of pin 42 and the point of engagement of the pawl 46 with the gear teeth 34.

A slightly modified form of the ratchet handle is shown in FIGURE 4. In this form of the invention the pawl 64 is slidably mounted in a blind bore 65 formed in the handle member 66. A reduced integral extension 68 of the pawl is slidably received in a bore 70 in the handle, the outer end of the extension 68 being provided with a reversing pin 72 which extends through a lateral slot 74 formed in the reduced end portion 76 of the handle. When it is desired to reverse the position of the pawl 64, the pin 72 is withdrawn from the end of the slot 74 and rotated 180° and re-inserted into the slot, the pin being maintained in the slot by the compression spring 78 which also urges the pawl into driving engagement with the teeth on the gear sector. The operation of this form of the invention is in all other respects the same as that shown in FIGURES 1, 2 and 3.

The operator thus far described operates by positive engagement of the pawl with the teeth of the gear segment or pinion. In the modified apparatus in FIGURES 5 and 6 to which detailed reference will now be made, motion is transmitted from the ratchet mechanism to the valve stem by frictional wedging contact between the members of the operator drive mechanism. In this form of the invention the gear sector is replaced by a wedge plate 132 having a central boss fitted snugly over the valve stem 134 and held in place by a set screw 136. The wedge plate 132 is provided with a peripheral driving surface 138 concentric with the axis of the valve stem 134 and has a pair of arcuate openings 140 and 142 also concentric with the axis of the valve stem. The opening 142 permits free movement of the wedge plate 132 with respect to the pivot pin 144 which pivotally supports the ratchet assembly 146, the lower end of the pin being received in a recess 147 formed in the valve cover plate 148 and the upper end of the pin being supported by a member 150 bolted to the cover plate as at 152. This construction provides rigid support for the pivot pin 144 which is subjected to relatively high loads in operation.

The ratchet assembly 146 has upper and lower arms 154 and 156 pivotally supported on the pin 144. A wedge pin 158 is mounted in aligned openings 160 and 162 formed in the respective upper and lower arms of the ratchet assembly 146, the openings being of substantially the same dimension as the pin 158 in a direction circumferentially of the valve stem and being elongated in a radial direction whereby the pin 158 may move with respect to the ratchet assembly 146 in a direction radially of the valve and relative movement of the pin with respect to the ratchet assembly in a direction circumferentially of the valve is prevented.

The pin 158, which is held in place by snap rings 164, also extends through an opening 166 formed in a wedge block 168 loosely received between the upper and lower arms of the ratchet assembly 146. The outer surface of the opening 166 is formed by a pair of straight wedging surfaces 170 and 172 which intersect at the axial midpoint of the opening 166. A pair of pins 174 are carried by arm portions of the wedging block 168 which extends inwardly above and below the wedge plate 132, the pins 174 extending with a close fit through the opening 140 in the wedge plate 132. The parts thus far described are so proportioned that the opening formed between the wedging surfaces 170 and 172 and the opposing outer peripheral drive surface 138 of the wedge plate is large enough to freely receive the pin 158 only in the region adjacent the intersection of the surfaces 170 and 172.

The position of the pin 158 is also controlled by a reversing slide 176 which extends through a recess 178 in the bottom of the wedge block 168. The reversing slide 176 has an elongated recess 180 through which the wedge pin 158 passes, the recess being effective when the reversing slide 176 is installed as shown in FIGURE 5 to prevent movement of the pin 158 in a counterclockwise direction as viewed in FIGURE 5. The reversing slide 176 is held in one of two selected positions by a pin 182 mounted in a boss at one side of the wedge block, the pin extending through one of two openings 184 in the reversing slide. In its alternate position the reversing slide is effective to prevent movement of the pin 158 in a clockwise direction from the position shown in FIGURE 5.

To operate the valve the ratchet assembly 146 is urged in a clockwise direction as viewed in FIGURE 5 carrying with it the pin 158. During the initial movement the wedge block 168 remains stationary. After a limited movement, the pin 158 begins to wedge between the surface 138 of the wedge plate 132 and the surface 172 on the wedge block. When the torque required to move the pin 158 relative to the wedge block 168 exceeds the torque required to move the valve stem, then the wedge block 168 and the wedge plate 132 will be moved in the further movement of the ratchet assembly 146. The movement of the ratchet assembly 146 will continue until mechanical interference develops between the parts. Then the assembly is turned in a counterclockwise direction to urge the pin 158 out of wedging position and back into the relatively enlarged portion of the opening 166. The pin 158 is prevented from moving into a wedging relation against the face 170 by abutment with the end of the opening 180 in the reversing slide 176. To produce further movement of the valve stem the operation is then repeated.

To reverse the direction of operation, the pin 182 which positions the reversing slide 176 is removed, the wedge block is re-positioned with the second of the openings 184 in alignment with the pin 182 and the pin is then re-inserted. The valve stem may be rotated in the opposite direction by an action identical to that described above except that it is effective in the reverse direction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A manual operator for a valve which may be opened or closed by approximately 90° rotation of a stem comprising a member rigid with said stem and having a drive surface concentric with the axis of said stem and spaced a substantial distance outwardly therefrom, a ratchet drive member, means mounting said drive member on said valve for pivotal movement about a fixed axis spaced from and substantially parallel to the axis of said stem and between the axis of said stem and said drive surface, said drive member extending from its pivotal axis a substantial distance outwardly beyond said drive surface, and a one-way reversible drive connection between said drive member and said drive surface.

2. A manual operator for a valve which may be opened or closed by 90° rotation of a stem comprising a member rigid with said stem and having a drive surface with a plurality of peripheral notches formed concentrically with the axis of said stem, said notches extending along an arc of about 90°, a drive member, means mounting said drive member on said valve for pivotal movement about a fixed axis spaced from and substantially parallel to the axis of the stem and between the axis of said stem and said drive surface, drive means on said drive member engageable with said notches, and means to prevent relative motion between said drive means and said drive member when said drive member is pivoted in one direction and to permit said relative motion when said drive member is pivoted in the opposite direction whereby said stem may be moved incrementally by a plurality of movements of said drive member in said one direction.

3. The valve operator according to claim 2 wherein said drive means comprises a pawl carried by said drive member and means yieldably urging said pawl into driving engagement with said notches.

4. The valve operator according to claim 3 wherein said pawl has a force transmitting surface on one side thereof together with means for rotating said pawl about its axis to dispose said surface selectively in opposite directions.

References Cited in the file of this patent
UNITED STATES PATENTS

| | | |
|---|---|---|
| 245,694 | Bacon | Aug. 16, 1881 |
| 604,771 | Mansfield | May 31, 1898 |
| 710,129 | Watrous | Sept. 30, 1902 |
| 816,477 | Kellogg | Mar. 27, 1906 |
| 1,300,477 | O'Connor | Apr. 15, 1919 |
| 1,426,718 | De Florez | Aug. 22, 1922 |
| 2,073,541 | Trott | Mar. 9, 1937 |
| 2,542,015 | Ellison | Feb. 20, 1951 |
| 2,641,136 | Marsden et al. | June 9, 1953 |
| 2,985,032 | Schroder | May 23, 1961 |

UNITED STATES PATENT OFFICE

CERTIFICATE OF CORRECTION

Patent No. 3,148,553                        September 15, 1964

Laurence H. Carr

It is hereby certified that error appears in the above numbered patent requiring correction and that the said Letters Patent should read as corrected below.

Column 6, line 18, after "directions." insert the following claims:

5. A manual operator for a valve which may be opened or closed by approximately 90° rotation of a stem comprising a member rigid with said stem and having a drive surface concentric with said stem, a drive member, means mounting said drive member on said valve for pivotal movement about an axis spaced from and substantially parallel to the axis of said stem and adjacent said drive surface, a pin carried by said drive member for movement with respect thereto toward and away from said drive surface, and means operable upon limited relative movement between said drive member and said driving surface in one direction for urging said pin radially inwardly into wedging contact with said driving surface.

6. The valve operator according to claim 5 together with means for maintaining said pin out of wedging contact with said driving surface when said drive member is moved in the opposite direction.

in the heading to the printed specification, line 7, for "4 Claims." read -- 6 Claims. --.

Signed and sealed this 12th day of January 1965.

(SEAL)
Attest:

ERNEST W. SWIDER
Attesting Officer
                                       EDWARD J. BRENNER
                                      Commissioner of Patents